US006205343B1

(12) United States Patent
Montgomery, Jr.

(10) Patent No.: US 6,205,343 B1
(45) Date of Patent: *Mar. 20, 2001

(54) PEAK CURRENT REDUCTION IN A CORDLESS TELEPHONE HANDSET

(75) Inventor: Hugh S. Montgomery, Jr., Lindenhurst, IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/653,895

(22) Filed: May 28, 1996

(51) Int. Cl.$^7$ ...................................................... H04Q 7/32
(52) U.S. Cl. .......................... 455/574; 455/566; 370/311
(58) Field of Search ................................. 455/38.3, 127, 455/343, 51.1, 89, 90, 95, 230, 231, 574, 566, 572, 575; 370/311

(56) References Cited

U.S. PATENT DOCUMENTS

| 5,204,986 | 4/1993 | Ito et al. .............................. 455/343 |
| 5,222,076 | 6/1993 | Ng et al. .................................... 375/9 |
| 5,361,397 | * 11/1994 | Wright .................................. 455/70 |
| 5,446,759 | 8/1995 | Campana, Jr. ........................ 375/267 |
| 5,509,015 | * 4/1996 | Tiedemann, Jr. et al. ........... 370/311 |
| 5,519,762 | 5/1996 | Bartlett .................................... 379/61 |
| 5,530,911 | * 6/1996 | Lerner et al. ......................... 455/343 |

OTHER PUBLICATIONS

"Sparprogramm beim Stromverbrauch", Urhonen, H., Published: Funkschau Aug. 1989, pp. 62–3.

* cited by examiner

Primary Examiner—Edward F. Urban
(74) Attorney, Agent, or Firm—John G. Rauch; Brian Mancini

(57) ABSTRACT

A method and apparatus reduces the peak current drawn from a DC-to-DC voltage converter (126) in a battery powered communication device such as a radiotelephone handset (104). The radiotelephone handset (104) enters high current operating conditions during transmit time slots (208, 210) and receive time slots (212, 214) defined by a TDMA protocol. During the receive time slots (212, 214) and the transmit time slots (208, 210), operating power is removed from a portion of the communication device, such as the display (120), to reduce the peak current drawn from the voltage converter (126). Excessive current drain from the battery (124) and rapid battery discharge are thereby eliminated.

14 Claims, 2 Drawing Sheets

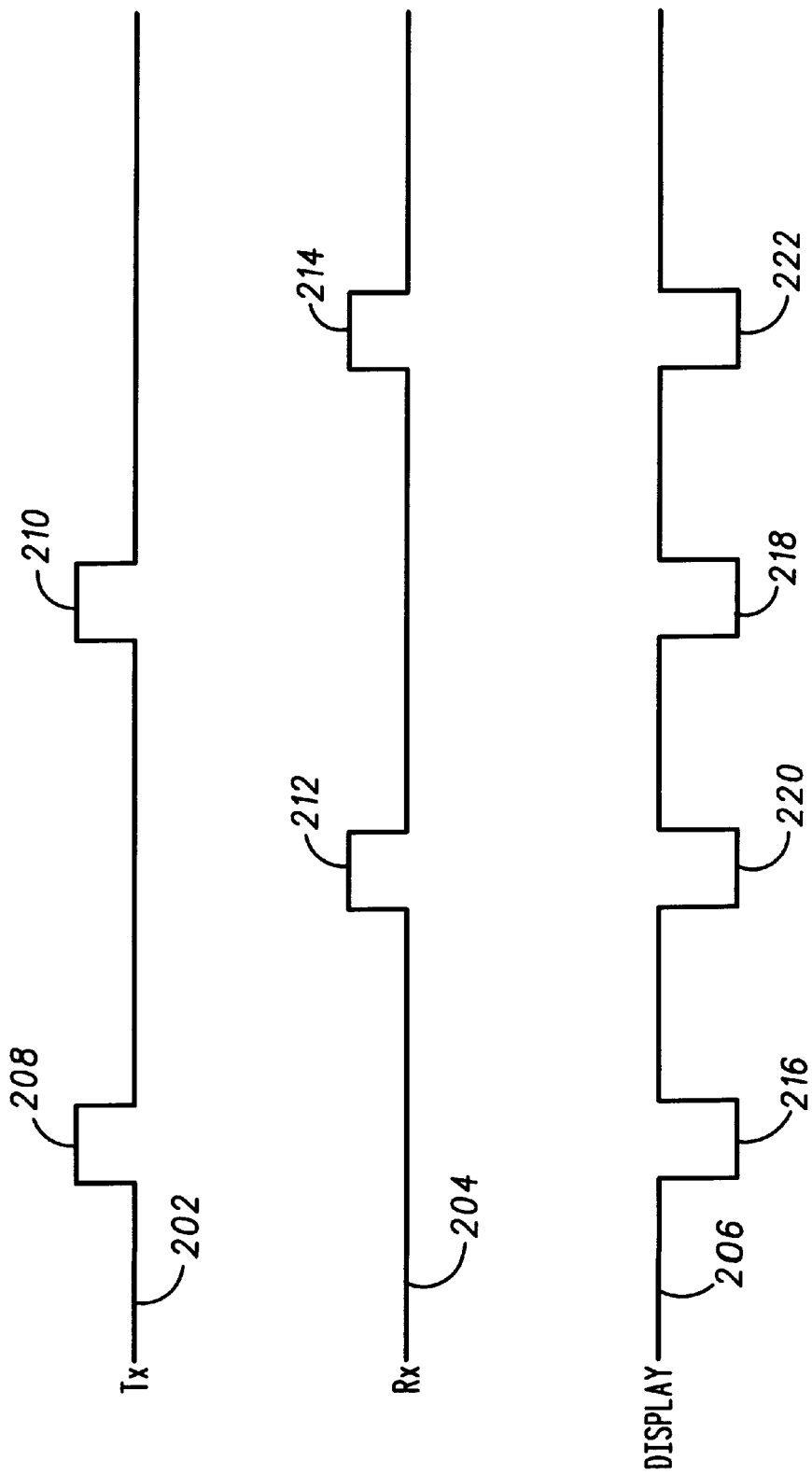

PEAK CURRENT REDUCTION IN A CORDLESS TELEPHONE HANDSET

FIELD OF THE INVENTION

The present invention relates generally to communication devices. The present invention relates more particularly to reduction of peak current in a communication device such as a cordless telephone handset.

BACKGROUND OF THE INVENTION

Many communication devices operate on battery power. For the convenience of the user, communication devices may be designed for use with commonly available batteries, such as "AA" or "AAA" cells. Two such cells in series provides an approximately 3.0 volt DC battery voltage. The communication device includes a DC-to-DC voltage converter to step up the battery voltage to an operating voltage, such as 5.0 volts. The voltage converter thus provides the operating voltage for the communication device.

Such voltage converters are not one hundred percent efficient, however. One commonly available voltage converter is approximately 80% efficient over an output current range of several hundred milliamps (mA). Efficiency is the ratio of the output power to the input power for the voltage converter. For output currents above about 600 mA, converter efficiency falls off rapidly. These values are representative only. Other voltage converters will have other efficiencies and other operational limitations.

The effect of reduced voltage converter efficiency at high current is increased power drain from the battery. As output current from the voltage converter increases, current drain from the battery increases proportionate to efficiency. If efficiency decreases as the output current increases, the current drawn from the battery will increase proportionately with both increasing output current and decreasing efficiency. Thus, at high current, the battery discharge rapidly, inconveniencing for the user.

Communication devices can be designed with low power dissipation to keep the current drawn from the voltage converter in a range of greatest efficiency. However, as portions of the communication device switch on and off, peak current drawn from the voltage converter may temporarily move the voltage converter into a low efficiency range. If such peaks occur frequently or are sustained in duration, the batteries will discharge rapidly.

Accordingly, there is a need for a method and apparatus for reducing the magnitude and duration of current peaks drawn from a voltage converter in a communication device.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 2 is a timing diagram illustrating operation of the communication device of FIG. 1 in accordance with the present invention.

DETAILED DESCRIPTION OF A PREFERRED EMBODIMENT

Figure 1:
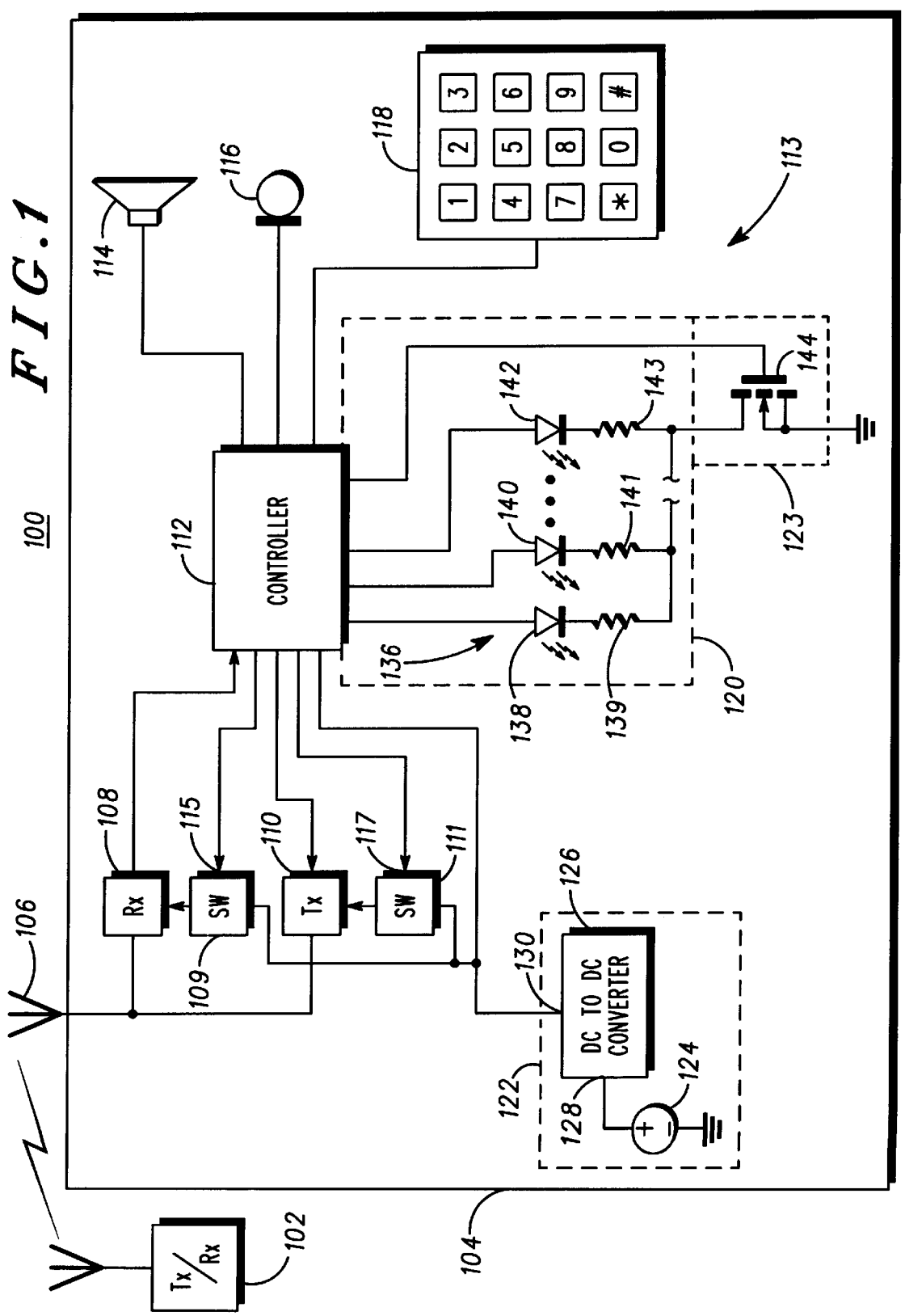
FIG. 1 is an operational block diagram of a communication system including a communication device with which the present invention may be used.

Referring now to FIG. 1, it shows a block diagram of a communication system 100. The communication system 100 includes a remote transceiver 102 and a communication device, radiotelephone handset 104. The remote transceiver 102 sends and receives radio frequency (RF) signals to and from radiotelephone handsets within a fixed geographic area. The RF signals include digital data transmitted serially and modulated by a carrier frequency. The radiotelephone handset 104 is one such radiotelephone handset contained within the geographic area.

The radiotelephone handset 104 includes an antenna 106, a receive circuit 108, a transmit circuit 110 and a controller 112. The controller 112 is coupled to other elements of the radiotelephone handset 104 by control lines, not all of which are shown in FIG. 1. The radiotelephone handset 104 further includes a user interface 113, including a speaker 114, a microphone 116, a keypad 118 and a display 120. The radiotelephone handset 104 still further includes a power source 122 and a switch 123.

Upon reception of RF signals, the radiotelephone handset 104 receives the RF signals through the antenna 106. The antenna 106 and receive circuit 108 convert the received RF signals into electrical baseband signals and provide corresponding data to the controller 112. The controller 112 formats the data into recognizable voice or information for use by user interface 113. The user interface 113 communicates the received information or voice to a user.

Upon transmission of radio frequency signals from the radiotelephone handset 104 to the remote transceiver 102, the user interface 113 transmits user input data to the controller 112. The controller 112 formats the information obtained from the user interface 113 and transmits it to the transmit circuit 110 for conversion into RF modulated signals. The transmit circuit 110 conveys the RF modulated signals to the antenna 106 for transmission to the remote transceiver 102.

In one embodiment, the radiotelephone handset 104 comprises a cordless telephone handset configured for communication with the remote transceiver 102 according to a time division, multiple access (TDMA) communication protocol. For example, the system 100 may operate according to the Digital European Cordless Telecommunication (DECT) protocol. Alternatively, the system 100 may operate according to the Personal Handy Phone System (PHS) protocol, used in Japan, or any other data communication protocol for cordless or cellular telephone systems. Such a protocol defines transmit time slots, for transmission from the radiotelephone handset 104 to the remote transceiver 102, and receive time slots for transmission from the remote transceiver 102 to the radiotelephone handset 104. Operation of the radiotelephone handset 104 in conjunction with such transmit time slots and receive time slots will be described in more detail below in conjunction with FIG. 2.

Associated with the receive circuit 108 is a switch 109. The switch 109 is coupled between the power source 122 and the receive circuit 108. The switch 109 has a control input 115 for receiving a receiver power control signal from the controller 112. In response to the receiver power control signal, the switch 109 removes power from the receive circuit 108. Similarly, associated with the transmit circuit 110 and coupled between the transmit circuit 110 and the power source 122 is a switch 111. The switch 111 has a control input 117 coupled to the controller 112 for receiving a transmitter power control signal. In response to the transmitter power control signal, the switch 111 removes power from the transmit circuit 110. The switch 109 and the switch 111 may be implemented in any suitable manner, including incorporating software interoperation with hardware elements of the radiotelephone handset 104, and may remove power only from high-current portions of the receive circuit 108 and the transmit circuit 110.

The display 120 includes a plurality 136 of light emitting diodes coupled in series with the switch 123. The plurality 136 of light emitting diodes includes light emitting diodes 138, 140 and 142. Each of the light emitting diodes 138, 140, 142 is coupled in series with an associated current limiting resistor, including resistors 139, 141, 143. In one embodiment, twelve light emitting diodes are included in the communication device, only some of which are shown in FIG. 1 so as to not unduly complicate the drawing figure. The light emitting diodes 138, 140, 142 are coupled to the controller 112 and are illuminated in response to control signals received from the controller 112. The light emitting diodes 138, 140, 142 include light emitting diodes which form the display, such as seven segment light emitting diodes for displaying alphanumeric characters, and individual light emitting diodes for providing a visual indication to a user of the radiotelephone handset 104. In addition, the light emitting diodes 138, 140, 142 includes one or more light emitting diodes for illuminating the keypad 118 by backlighting the keypad 118. Preferably, the light emitting diodes 138, 140, 142 draw only a relatively small operating current from the power source 122. In one embodiment, each light emitting diode draws approximately 5 mA from the power source 122 when illuminated. Thus, twelve light emitting diodes draw 60 mA from the power source 122.

The switch 123 comprises a MOSFET (metal-oxide-semiconductor field effect transistor) 144. The switch 123 selectively decouples the display 120 from the power source 122 in response to a display control signal from the controller 112. The light emitting diodes 138, 140, 142 included in the display are coupled together at a common node 146. The drain of the MOSFET 144 is coupled to the common node 146 and the source of the MOSFET 144 is coupled to ground potential. The gate of the MOSFET 144 is coupled to the controller 112 for receiving the display control signal. When the display control signal is a high voltage level, the MOSFET 144 is turned on, permitting current flow in the light emitting diodes 138, 140, 142. When the display control signal is a low voltage level, the MOSFET 144 is turned off, interrupting current flow in the plurality 136 of light emitting diodes in response to the control signal from the controller 112. If the keypad 118 is backlit or otherwise illuminated by one or more light emitting diodes, the switch 123 including the MOSFET 144 interrupts current flow in the one or more light emitting diodes in response to the display control signal.

The power source 122 provides operating power for the radiotelephone handset 104. The power source 122 includes a battery 124 and a voltage converter 126. The battery 124 is any suitable battery. For user convenience, the battery 124 is one or more "AA" or "AAA" cells of the type which is commonly available. Such cells are light weight and store substantial charge to provide long operating life for the radiotelephone handset 104. To further enhance user convenience, the cells may be rechargeable. The battery 124 may comprise two such cells coupled in series to provide an approximately 3.0 volt DC battery voltage.

The voltage converter 126 is a DC-to-DC voltage converter. The voltage converter 126 has an input 128 for receiving the battery voltage and an output 130. The voltage converter 126 generates an output current at an operating voltage for the radiotelephone handset 104. A typical value for the battery voltage is 3.0 VDC and a typical value for the operating voltage in 5.0 VDC. The voltage converter 126 is preferably a LT1302 voltage converter available from Linear Technology Corporation, Milpitas, Calif.

The voltage converter 126 has an operating region of maximum efficiency. The voltage converter 126 nominally has an efficiency of 80 percent up to an output current of approximately 600 mA. The efficiency is the ratio of output power to input power. Keeping the battery voltage substantially constant and the operating voltage substantially constant, the efficiency is therefore a ratio of the current drawn from the battery and the output current. At an output current of 600 mA, the battery current is approximately 750 mA. Beyond the output current of 600 mA, the efficiency falls off rapidly and the battery current increases rapidly. Therefore, it is desirable to operate the radiotelephone handset 104 at or below a peak current corresponding to an output current from the voltage converter of 600 mA. Thus, the voltage converter 126 has a maximum operating current of 600 mA. These numbers are illustrative only. Other voltage converter models will perform differently.

The transmit circuit 110 has relatively high power consumption. Similarly, the receive circuit 108 also has relatively high power consumption. To reduce the overall power consumption in the radiotelephone handset 104, the transmit circuit 110 and the receive circuit are powered down during times when these circuits are not active.

If the radiotelephone handset 104 is operating in a communication system according to a TDMA communication protocol, the TDMA protocol creates ideal opportunities for powering down the transmit circuit 110 and the receive circuit 108. As noted above, a TDMA protocol defines transmit time slots and receive time slots for communication between the radiotelephone handset 104 and the remote transceiver 102. For example, a radiotelephone handset operating according to the DECT protocol transmits for transmit time intervals having a duration of 438 μsec every 10 msec. To reduce power consumption in the radiotelephone handset 104, the radiotelephone handset 104 selectively provides operating power to the transmit circuit 110 during these transmit time intervals. This is accomplished by selective application of the transmitter power control signal from the controller 112. Similarly, the receive circuit 108 receives during receive time intervals. To reduce power consumption in the radiotelephone handset 104, the controller 112 selectively provides operating power to the receive circuit 108 during these receive time intervals.

To further reduce power consumption, a communication device according to the present invention removes operating power from a portion of the communication device during the transmit time intervals to reduce the peak current. The controller 112 removes operating power from the portion of the communication device to limit the output current from the voltage converter 126 to less than a maximum output current, such as 600 mA. By reducing the peak current, the voltage converter 126 remains in its operating region of maximum efficiency. By reducing the peak current, the voltage converter 126 does not draw excessive current from the battery 124, thereby extending the operating life of the battery.

The portion of the communication device from which operating power is removed may be any unnecessary circuit element or circuit component. Preferably, the removal of operating power is not apparent to the user of the communication device. Further, the controller also removes operating power from the portion of the communication device during receive time intervals as well as transmit time intervals.

In accordance with the present invention, operating power is removed from the display 120 during the transmit time intervals. The controller 112 provides the control signal to the switch 123 and the switch 123 interrupts current flow in the plurality 136 of light emitting diodes. Operating power is removed from the display 120 during a time interval imperceptible to the user of the radiotelephone handset 104.

The transmit time intervals preferably correspond to TDMA transmit time slots and the receive time intervals preferably correspond to TDMA receive time slots. Referring now to FIG. 2, it shows a timing diagram illustrating operation of the communication device of FIG. 1 in accordance with the present invention. FIG. 2 shows a first wave form 202 corresponding to the transmitter power control signal provided to the switch 111 by the controller 112, a second wave form 204 corresponding to the receiver power control signal provided to the switch 109 by the controller 112, and a third wave form 206 corresponding to the display control signal provided to the switch 123.

The transmit circuit 110 transmits to the remote transceiver 102 during transmit time slots defined by the time division multiple access communication protocol and the receive circuit 108 receives from the remote transceiver 102 during receive time slots defined by the time division multiple access communication protocol. The controller 112 removes operating power from the portion of the operating circuitry during at least one of the transmit time slots and the receive time slots to reduce peak current from the power source 122. The transmit time intervals and the receive time intervals for removing power from the portion of the communication device may be longer or shorter in duration than the time slots.

In FIG. 2, the wave form 202 indicates that switch 111 is actuated to provide power to the transmit circuit 110 only during transmit time slots 208, 210 during which the radiotelephone handset 104 is transmitting. The switch 111 removes power from the transmit circuit 110 at times other than the transmit time slots 208, 210. In the same manner, the wave form 204 indicates that switch 109 is actuated to provide power to the receive circuit 108 only during receive time slots 212, 214. The switch 109 removes power from the receive circuit 108 at times other than the receive time slots 212, 214.

Also in FIG. 2, the wave form 206 indicates that the controller 112 provides the display control signal to the switch 123 during transmit time intervals 216, 218. Also, the controller provides the display control signal to the switch 123 during receive time intervals 220, 222. In response to the display control signal, the switch 123 removes power from the display 120, to reduce peak current from the power source 122.

As can be seen from the foregoing, the present invention provides a method and apparatus for reducing the peak current drawn from a DC-to-DC voltage converter in a battery powered communication device such as a cordless telephone handset. The handset enters high current operating conditions during transmit time slots and receive time slots defined by a TDMA protocol. During the receive time slots and the transmit time slots, operating power is removed from a portion of the communication device, such as the display, to reduce the peak current drawn from the voltage converter. Excessive current drain from the battery and rapid battery discharge are thereby eliminated.

While a particular embodiment of the present invention has been shown and described, modifications may be made. For example, the invention may be applied to communication devices other than a radiotelephone handset, such as a paging receiver, or any other current-sensitive battery powered devices. It is therefore intended in the appended claims to cover all such changes and modifications which fall within the true spirit and scope of the invention.

What is claimed is:

1. A method for reducing a peak current in a voltage converter during communications in a communication device, the method comprising the steps of:

providing operating power from a power source through a voltage converter to the communication device, the voltage converter having an efficiency which varies with current provided to the communication device;

selectively providing operating power through a first switch in response to a first control signal from a controller to a transmit circuit during transmit time intervals for transmitting from the communication device;

concurrently removing operating power through a second switch in response to a second control signal from the controller from a display of the communication device to limit a current from the voltage converter to less than a maximum level during the transmit time intervals to reduce the peak current to maintain the voltage converter in an operating region of maximum efficiency; and maintaining power to the voltage converter and the controller.

2. A method as recited in claim 1 further comprising a step of selectively providing operating power through a third switch in response to a third control signal from the controller to a receive circuit during receive time intervals for receiving in the communication device, and wherein the step of removing operating power includes removing operating power from the display during the receive time intervals.

3. A method as recited in claim 2 wherein the step or removing operating power further comprises the step of removing operating power from the display during a time interval imperceptible to a user of the communication device.

4. A communication device, comprising:

a transmit circuit for transmitting during transmit time intervals, and a receive circuit for receiving during receive time intervals;

a power source for providing operating power;

a voltage converter for passing power from the power source to the communication device, the voltage converter having an efficiency which varies with current provided to the communication device;

a controller for selectively removing operating power from a display of the communication device during at least one of the transmit and receive time intervals to reduce peak current through the voltage converter below a maximum level so as to maximize efficiency of the voltage converter, the power source, voltage converter and controller being continually powered;

a first switch coupled to the controller, the first switch for selectively decoupling the transmit circuit from the power source in response to a first control signal from the controller; and a second switch coupled to the controller, the second switch for selectively decoupling the display from the power source in response to a second control signal from the controller.

5. A communication device as recited in claim 4 wherein the display includes a plurality of light emitting diodes coupled in series with the power source and the second switch, the second switch interrupting current flow in the plurality of light emitting diodes in response to the second control signal from the controller.

6. A communication device as recited in claim 5 wherein the communication device further includes a keypad including one or more light emitting diodes for illuminating the keypad, and wherein the second switch further interrupts current flow in the one or more light emitting diodes in response to the control signal.

7. A communication device as recited in claim 4 wherein the power source comprises a battery, the display is an LED display, and the controller removes operating power from the display of the communication device during the transmit and receive time intervals.

8. A communication device as recited in claim 4 wherein the communication device operates according to a time division, multiple access communications protocol defining transmit time slots and receive time slots for the communication device, and wherein the controller removes operating power from the display of the communication device during the transmit and receive time intervals corresponding to the transmit time slots and receive time slots.

9. A communication device as recited in claim 8 wherein the transmit time intervals are longer than the transmit time slots and the receive time intervals are longer than the receive time slots.

10. A communication device as recited in claim 4 wherein the controller removes operating power from the transmit circuit during times other than the transmit time intervals.

11. A radiotelephone handset configured for communication with a remote transceiver according to a time division multiple access communication protocol, the radiotelephone handset comprising:

a power source for providing operating power;

a voltage converter with an efficiency which varies with current provided to the radiotelephone handset from the power source;

a transmit circuit coupled to the power source through the voltage converter for receiving operating power, the transmit circuit transmitting to the remote transceiver during transmit time slots defined by the time division multiple access communication protocol;

a receive circuit coupled to the power source through the voltage converter for receiving operating power, the receive circuit receiving from the remote transceiver during receive time slots defined by the time division multiple access communication protocol;

a controller for selectively removing operating power from a display of the radiotelephone handset during at least one of the transmit time slots and the receive time slots for reducing peak current so as to operate the voltage converter at maximum efficiency, the power source, voltage converter and controller being continually powered;

a first switch coupled to the controller, the first switch for selectively decoupling the transmit circuit from the power source in response to a first control signal from the controller; and a second switch coupled to the controller, the second switch for selectively decoupling the display from the sower source in response to a second control signal from the controller.

12. A radiotelephone handset as recited in claim 11 wherein the radiotelephone handset further comprises a keypad including one or more light emitting diodes for illuminating the keypad, the keypad being powered through the second switch in response to the second control signal from the controller.

13. A radiotelephone handset as recited in claim 12 wherein the power source comprises a battery, the voltage converter having a maximum output current, the controller removing output power from the display and the one or more light emitting diodes to keep the peak current less than the maximum output current.

14. A radiotelephone handset as recited in claim 11 wherein the radiotelephone handset comprises a cordless telephone handset.

* * * * *